Dec. 6, 1966  H. A:SON MOBERG  3,289,792
APPARATUS FOR ABSORPTION OF ENERGY FROM A MOVING LOAD
Original Filed March 25, 1963  7 Sheets-Sheet 1

Inventor
Harald A:son Moberg
By
Wenderoth, Lind & Ponack
Attorneys

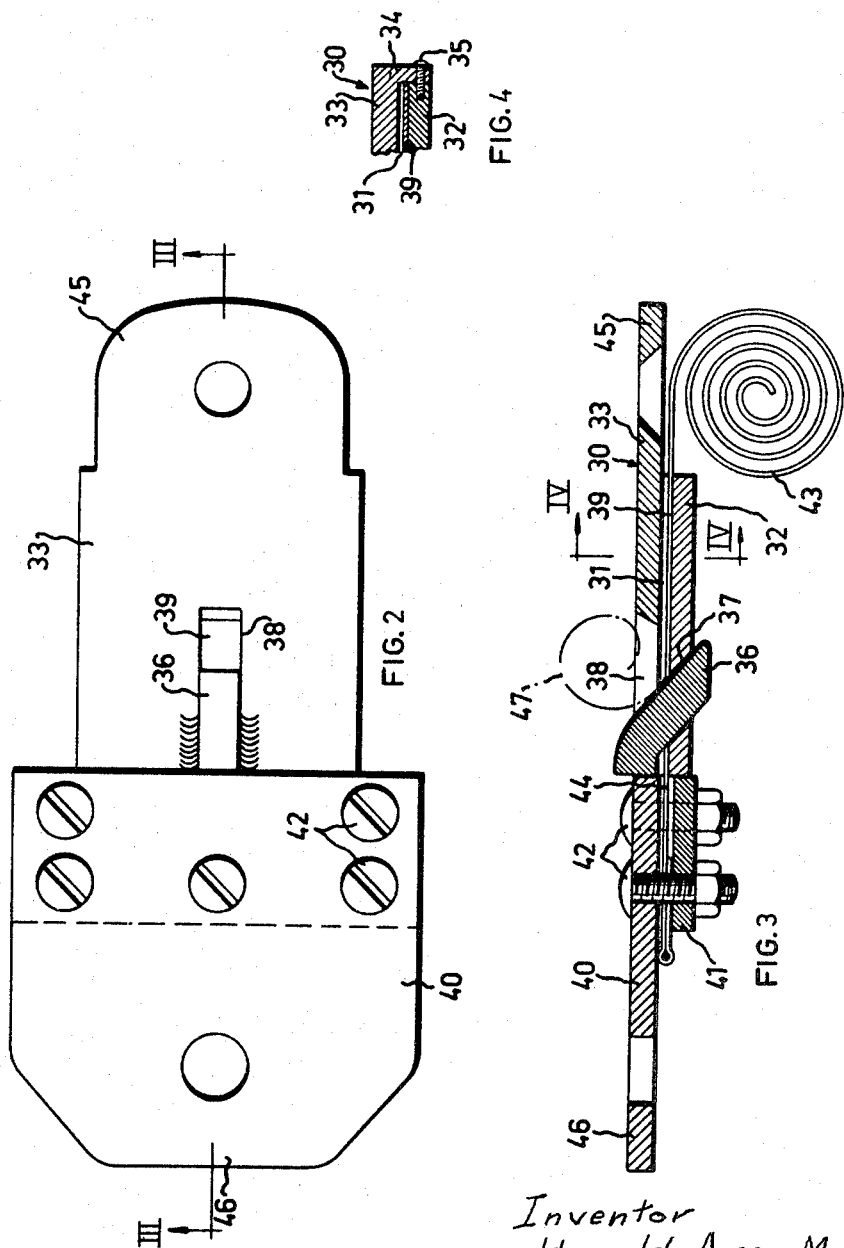

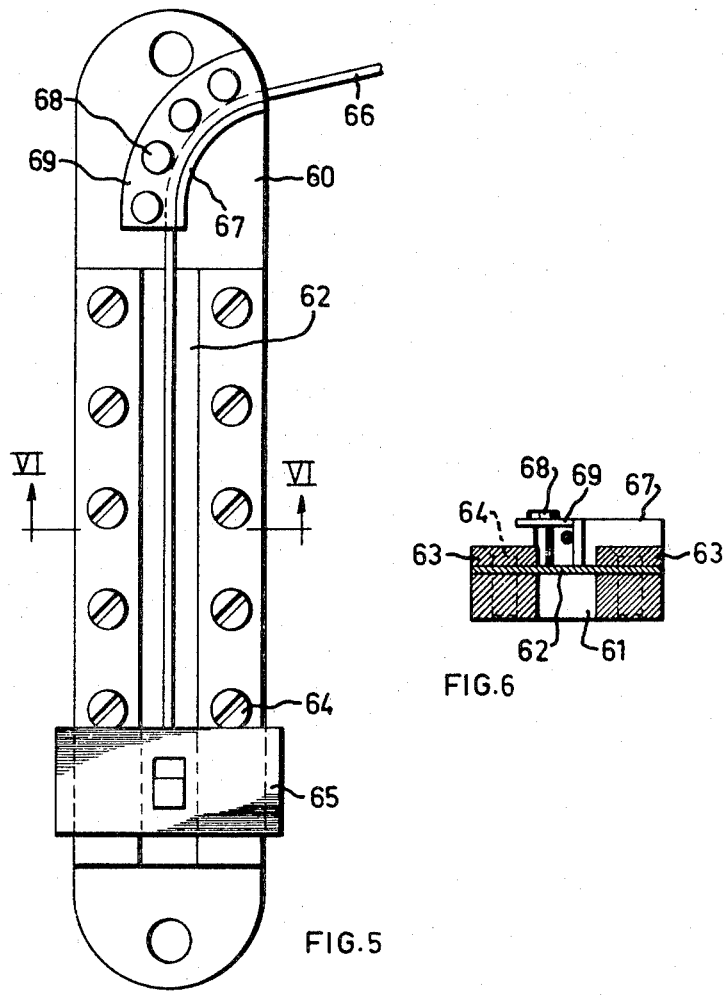

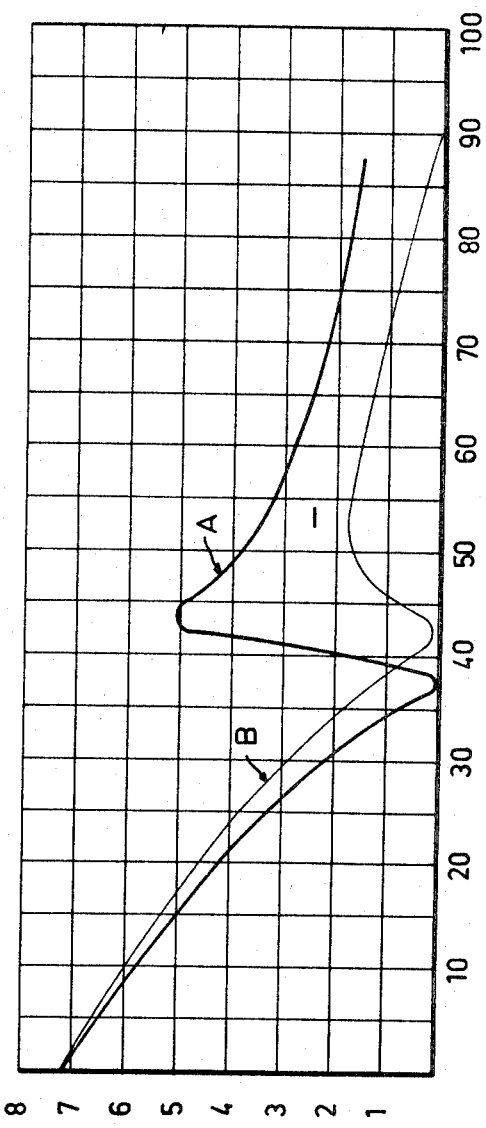

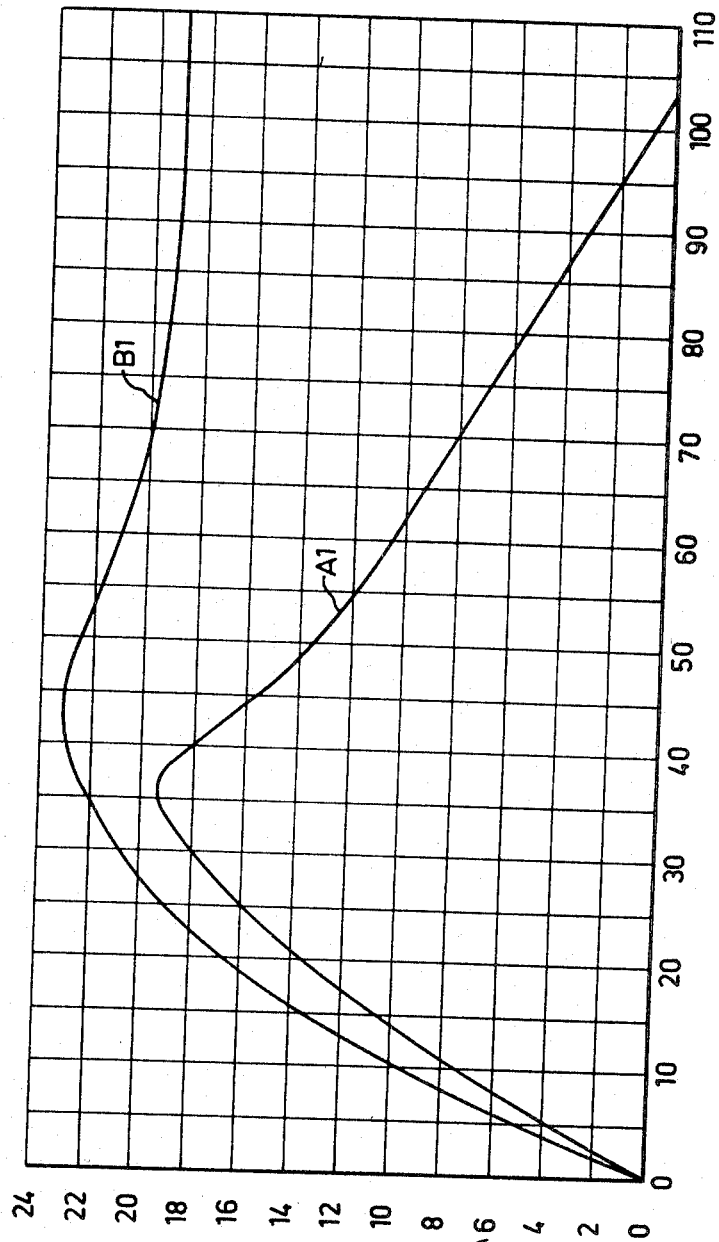

United States Patent Office 3,289,792
Patented Dec. 6, 1966

3,289,792
APPARATUS FOR ABSORPTION OF ENERGY
FROM A MOVING LOAD
Harald A:son Moberg, Sveavagen 25, Uppsala, Sweden
Original application Mar. 25, 1963, Ser. No. 267,520, now
Patent No. 3,232,383, dated Feb. 1, 1966. Divided
and this application Oct. 21, 1965, Ser. No. 499,645
Claims priority, application Sweden, Mar. 26, 1962,
3,338/62
4 Claims. (Cl. 188—1)

This application is a division of my application Serial No. 267,520 filed on March 25, 1963, now Patent No. 3,232,383.

The present invention relates to an apparatus for absorption of energy from a moving load comprising two elements which are relatively movable by the movement of the load, said relative movement taking place against the action of shearing and plastic deformation of a material.

To make possible that the energy absorption in such an apparatus be adapted to varying circumstances and requirements and to make the apparatus easily operative again once it has been in operation it is suggested according to the present invention to provide the material to be shorn and plastically deformed as a metal sheet on one element and to arrange the other element as a means displaceable along said metal sheet for continuous shearing-off of at least one strip from the metal sheet throughout said metal sheet and for continuous plastic deformation of the shorn-off metal strip at a relative movement between the two elements. Sheet metal is a comparatively cheap material which is easily exchanged and which by lamination or otherwise is easily given varying thicknesses along the shearing path to attain the characteristic curve, desired in each particular case, for the energy absorption in relation to the distance the load moves.

The apparatus according to the invention can be employed to absorb energy of motion of any load whatever to damp a shock, pressure or pull. The following uses of the apparatus may be mentioned by way of example: protection against load displacement in trucks and other vehicles; braking means in connection with devices for catching aircraft and other vehicles, e.g. arresting gears for the landing strips of airports and aircraft carriers; shock absorbers in safety netting for catching human beings and loads; bumpers for vehicles and bumping stops; fender devices protecting against extremely heavy collisions in ferry landing stages and the like; simple and directly useful mechanical aids in measuring the energy of shocks etc.; and safety devices in motor cars for protecting the seat occupants against collision injuries. In the last-mentioned case the apparatus can be employed as an energy absorber between a seat displaceable longitudinally of the vehicle and the vehicle body to provide, in the event of a collision, a gentle braking of the person who occupies the seat by retaining him in his seat with the aid of a suitable belt or harness anchored in the seat and who at a violent braking of the vehicle is moved forward with his seat when said seat as a result of the braking is displaced relative to the vehicle body under simultaneous arresting of its relative movement by means of the energy absorbing apparatus. However, the apparatus according to the invention may also be included in safety seat belts for motor cars, which are anchored in a known manner in the car body.

For elucidation of the invention some embodiments thereof, which have been developed for testing purposes, as well as the considerations and test results on which the invention is based, will be described more in detail in the following, reference being had to the accompanying drawings, in which:

FIG. 2 is a plan view of an embodiment of the shearing apparatus;

FIG. 3 is a section on line III—III in FIG. 2;

FIG. 4 is a section of a detail on line IV—IV in FIG. 3;

FIG. 5 is a plan view of another embodiment of the shearing apparatus;

FIG. 6 is a section on line VI—VI in FIG. 5;

FIG. 9 is a diagram showing the absolute speed of the strapped person on a time base;

FIG. 10 is a diagram showing the distance the strapped person moves relative to the motor car on a time base;

Figure 1:
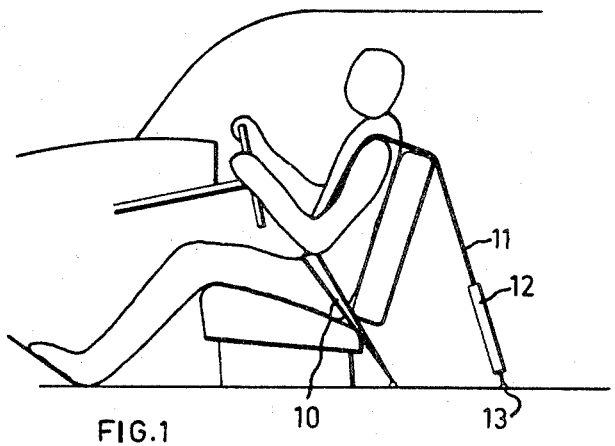
FIG. 1 is a view of a safety seat belt having a shearing apparatus according to the invention.

FIG. 1 of the drawings shows a safety seat belt including a hip strap 10 anchored in the floor structure of the motor car on either side of the seat, and a chest strap 11 extending from said hip strap over one shoulder of the strapped person and connected with a shearing apparatus 12 by means of which the chest strap 11 is anchored in the floor structure of the motor car behind the seat at a fixation point 13.

The shearing apparatus shown in FIGS. 2–4 includes a slide 30 having a channel 31 defined between a plate 32 and a plate 33, the latter plate being secured with its marginal flanges 34 by screws 35 to the side edges of the plate 32. A tongue 36 firmly welded to the plate 33 extends through the channel 31 into an opening 37 in the plate 32, and above said tongue the plate 33 has an opening 38 of at least the same width as that of the tongue 36. A sheet metal band 39 extends through the channel 31 and has one end firmly secured between two plates 40 and 41 which are secured together by screws 42. Adjacent the other end the sheet metal band 39 is coiled into a helix 43. The end of the sheet metal band secured between the plates 41 and 42 presents a slot 44 through which the tongue 36 extends. The slide 30 has a lug 45, which is formed by the plate 33, to permit connection thereof for instance with the safety seat belt, and the element formed by the secured-together plates 40 and 41 has a lug 46, which is formed by the plate 40, to permit connection thereof for example with the fiixation point in the car body.

When the shearing apparatus according to FIGS. 2–4 is disposed in this manner in a safety seat belt and a load is applied to this belt the slide 30 and the element 41, 42 will be pulled apart provided that the force is sufficiently large, the slide 30 being moved along the sheet metal band 39 under successive straightening of the helix 43 and shearing-off of a strip from the sheet metal band by means of the tongue 36. The width of this strip corresponds to that of the tongue 36 and the strip is urged by the tongue 36 out of the slide 30 through the opening 38 therein under plastic deformation, coiling itself above the tongue 36, as indicated by a dash and dot line 47.

Comparative experiments have been made to establish the relations in a conventional safety seat belt of fabric and a non-stretchable safety seat belt (of steel wire) equipped with a shearing apparatus, and the results of these comparative experiments are shown in FIGS. 9 and 10. In the experiments use was made of a dummy which was strapped to a test vehicle merely by means of a hip strap. The test vehicle was accelerated and caused to stop abruptly by impact against an obstacle. Curve A in FIG. 9 indicates the absolute speed of the strapped dummy (the ordinate) on a time base (the abscissa) when the safety seat belt consisted of an ordinary fabric belt. As will be seen, the strapped dummy approximately 38 milliseconds after the collision moment which is represented by the ordinate in FIG. 9 and in which the strapped dummy had an absolute speed of about 7 meters per second, reached the speed of zero but that, as a result of the spring-back of the safety seat belt, at the short time of about 6 milliseconds a speed of 5 meters per second in the opposite direction was imparted to the dummy (in the diagram in FIG. 9 the negative speed also has been plotted on the positive side of the abscissa). This important acceleration of the strapped dummy by reason of the spring-back of the safety seat belt implies a dangerous threat to the strapped dummy. Curve B in FIG. 9 indicates the absolute speed of the strapped dummy with the use of a hip-embracing non-stretchable belt (steel wire belt) in combination with the shearing apparatus but otherwise under identical conditions. The strapped dummy was now braked somewhat more slowly in that the speed of zero was reached about 5 milliseconds later than with the use of a fabric belt, viz. about 43 milliseconds after the collision moment. However, particular attention should here be paid to the fact that the braking to zero speed is not followed by any abrupt acceleration of the type illustrated by curve A but only by an insignificant increase of speed in the opposite direction to 1.8 meters per second for a time of about 10 milliseconds. This spring-back which will have its cause in a certain resilience of the testing equipment, is not dangerous to strapped persons.

FIG. 10 shows the distance the strapped dummy moves relative to the vehicle (the ordinate) on a time base (the abscissa), curve A1 relating to the experiment using an ordinary fabric belt and curve B1 relating to the experiment using a non-stretchable belt (steel wire belt) and shearing apparatus. It will be evident that according to curve A1 the strapped dummy was thrown forwards from the seat but then jerked back again against the seat, while according to curve B1 the strapped dummy was practically not jerked back after the forward movement immediately after the collision moment because the forward movement took place under a practically purely plastic yielding of the safety belt.

The force required for shearing off and plastically deforming the sheet metal strips will be dependent on the nature of the shorn-off material, the thickness of the metal sheet and the width of the shorn-off metal strips.

Figure 8:
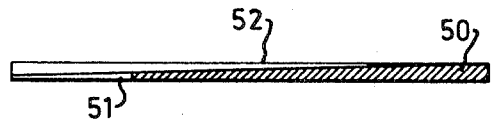
FIG. 8 is a longitudinal sectional view of the metal sheet in FIG. 7.
Figure 7:
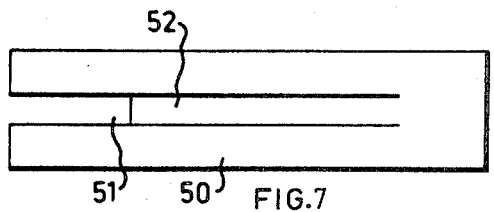
FIG. 7 is a plan view of a metal sheet for the shearing apparatus according to FIGS. 2–4.
Figure 11:
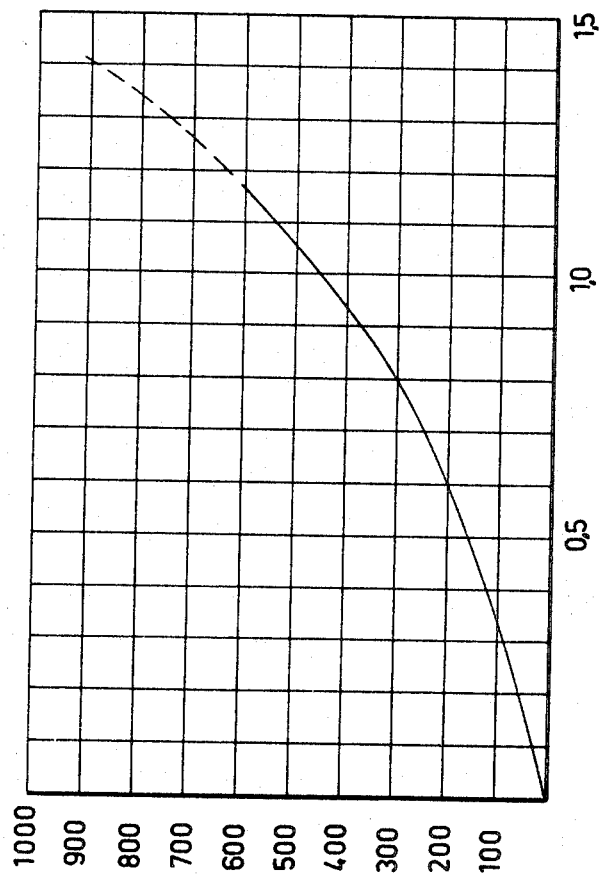
FIG. 11 is a diagram showing how the shear force depends on the thickness of the shorn metal sheet.
Figure 12:
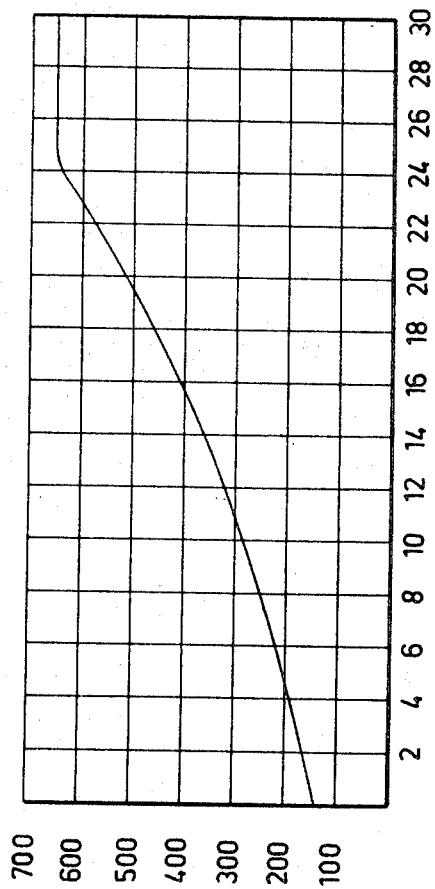
FIG. 12 is a diagram showing the shear force in relation to the shearing distance for a metal sheet of the embodiment shown in FIGS. 7 and 8.

The shearing apparatus described offers the possibility of making the resistance realized by the shearing apparatus dependent on the shearing distance, and FIGS. 7 and 8 show a sheet metal band for use in the shearing apparatus according to FIGS. 2–4. The sheet metal band in FIGS. 7 and 8 is generally designated 50 and presents the slot referred to in connection with FIGS. 2–4 and here designated 51. Starting from the inner end of said slot is a central groove 52 which runs longitudinally of the sheet metal band and is of a width corresponding to that of the tongue 36. Said groove is of a depth successively decreasing from a highest value at the inner end of the slot 51 so that the groove finally disappears. The shear and deformation force is dependent int. al. on the sheet metal thickness as has been shown in FIG. 11 for a black plate, and therefore an ever increasing force is required to shear off and plastically deform the strip of the sheet metal band 50 formed by the bottom of the groove 52. This is illustrated in FIG. 12 which shows the relation of the force to the shearing distance with the use of black plate in which there has been provided a groove of successively decreasing depth so that the sheet metal thickness in the groove varies from 0.3 mm. to 1.25 mm. over a length of 24 cm. Over this length the shear force required rises from 150 kp. to 650 kp. Any desired course whatever of the curve in FIG. 11 can be obtained by variation of the sheet metal thickness.

The shearing apparatus must not necessarily be directly connected with the safety seat belt. It is very well conceivable to dispose or mount the shearing apparatus wherever that is considered most suitable and to connect it with the safety seat belt by means of a steel wire which is easily passed over guides between different points in the vehicle. FIGS. 5 and 6 show an embodiment of the shearing apparatus intended for such mounting. This embodiment in its way is a combination of the two earlier described embodiments and includes an elongated plate 60 which is to be secured in the car body and which has a longitudinal central slot 61. Said slot is covered by a metal sheet 62 which is clamped to the plate 60 between the latter and a pair of rails 63 secured to the plate 60 by countersunk screws 64. On the element formed by plate 60, metal sheet 62 and rails 63 there is guided for longitudinal movement a slide 65 of similar design as the slide 30 according to FIGS. 2–4 inasmuch as the slide in a manner not shown in detail has a tongue for shearing-off a strip from the metal sheet 62 in the slot 61. Said slide 65 is connected with the safety seat belt (not shown) by a steel wire 66. At the upper end of plate 60 the wire 66 is guided in a passage between a metal sheet 67 upstanding at right angles from plate 60, headed pins 68 fixed to said plate, and a metal sheet 69 bridging the distance between metal sheet 67 and pins 68.

The embodiments of the invention described and shown in the foregoing are many in number but nowise exhaustive. As a further example it may be mentioned that one of the relatively movable elements may be in the shape of an arm radially projecting from a rotatable shaft and having a transverse tongue which is movable by rotation of the shaft in a circular movement along a circular or annular metal sheet carried by the other element to shear off a circularly bent strip from said metal sheet and to plastically deform said strip.

What I claim and desire to secure by Letters Patent is:

1. An apparatus for absorption of energy from a moving load comprising a metal sheet in the shape of a coiled elongated band, means supporting said metal sheet, said metal sheet having one end secured in said means, a slide guided for movement along said metal sheet relative to the metal sheet and said supporting means, and means on said slide for continuously cutting through the entire thickness of said metal sheet to thereby sever at least one strip from the metal sheet and for continuous plastic deformation of the shorn-off metal strip when said slide is displaced relative to said metal sheet and said supporting means.

2. An apparatus for absorption of energy from a moving load comprising two elements relatively movable by the movement of the load, a metal sheet on one of said two elements, the other of said two elements being displaceable as a slide along said metal sheet, and means on said other element for continuously cutting through the entire thickness of said metal sheet to thereby sever at least one strip from the metal sheet throughout said metal sheet and for continuous plastic deformation of the shorn-off metal strip at a relative movement between the two elements.

3. An apparatus as claimed in claim 2, in which said metal sheet is of varying thickness at least in the path of motion of said shearing means.

4. An apparatus for absorption of energy from a moving load comprising a metal sheet, means supporting said metal sheet, a slide guided for movement along said metal sheet relative to the metal sheet and said supporting means, flexible means connecting one end of said means and said slide with said moving load, the other end of said means and said slide being fixedly anchored, and means on said slide for continuously cutting through the entire thickness of said metal sheet to thereby sever at least one strip from the metal sheet and for continuous plastic deformation of the shorn-off metal strip at a movement of said slide relative to said metal sheet and said supporting means.

References Cited by the Examiner

FOREIGN PATENTS 1,105,404 6/1955 France.
905,836 9/1962 Great Britain.

DUANE A. REGER, *Primary Examiner.*